US012600409B2

(12) United States Patent (10) Patent No.: US 12,600,409 B2
Sonoda et al. (45) Date of Patent: Apr. 14, 2026

(54) WORK MACHINE AND METHOD FOR CONTROLLING WORK MACHINE

(71) Applicant: KOMATSU LTD., Tokyo (JP)

(72) Inventors: Takuya Sonoda, Tokyo (JP); Takashi Maeda, Tokyo (JP); Yoshihide Nakae, Tokyo (JP)

(73) Assignee: KOMATSU LTD., Tokyo (JP)

( * ) Notice: Subject to any disclaimer, the term of this patent is extended or adjusted under 35 U.S.C. 154(b) by 154 days.

(21) Appl. No.: 18/560,455

(22) PCT Filed: Jun. 15, 2022

(86) PCT No.: PCT/JP2022/023962
§ 371 (c)(1),
(2) Date: Nov. 13, 2023

(87) PCT Pub. No.: WO2023/021826
PCT Pub. Date: Feb. 23, 2023

(65) Prior Publication Data
US 2024/0253699 A1 Aug. 1, 2024

(30) Foreign Application Priority Data
Aug. 20, 2021 (JP) ................................. 2021-134906

(51) Int. Cl.
*B62D 17/00* (2006.01)
*E02F 9/22* (2006.01)
(52) U.S. Cl.
CPC .............. *B62D 17/00* (2013.01); *E02F 9/225* (2013.01)
(58) Field of Classification Search
CPC ................................. B62D 17/00; E02F 9/225
(Continued)

(56) References Cited

U.S. PATENT DOCUMENTS 8,412,420 B2 4/2013 Ruhter et al.
2012/0150390 A1* 6/2012 Ruhter .................. E02F 3/7645
701/42
(Continued)

FOREIGN PATENT DOCUMENTS

EP 1078844 A2 2/2001
JP 2007-112197 A 5/2007
(Continued)

OTHER PUBLICATIONS

The International Search Report for the corresponding international application No. PCT/JP2022/023962, issued on Aug. 30, 2022.
(Continued)

*Primary Examiner* — Lindsay M Low
*Assistant Examiner* — Omar Morales
(74) *Attorney, Agent, or Firm* — Spencer Fane LLP

(57) ABSTRACT

A work machine includes a vehicle body, a steering control wheel, a first actuator, a second actuator, a steering angle sensor, a leaning angle sensor, and a controller. The steering control wheel is supported by the vehicle body. The first actuator changes a steering angle of the steering control wheel. The second actuator changes a leaning angle of the steering control wheel. The steering angle sensor outputs a first angle signal indicative of the steering angle. The leaning angle sensor outputs a second angle signal indicative of the leaning angle. The controller acquires the first angle signal and the second angle signal, acquires the steering angle based on the first angle signal, acquires the leaning angle based on the second angle signal, acquires a target leaning angle corresponding to the steering angle, and controls the second actuator so that the leaning angle becomes the target leaning angle.

6 Claims, 10 Drawing Sheets

(58) Field of Classification Search
USPC ........................................................ 701/42
See application file for complete search history.

(56)                      References Cited

U.S. PATENT DOCUMENTS

| | | | |
|---|---|---|---|
| 2018/0134336 A1 | 5/2018 | Yoshino et al. | |
| 2019/0144035 A1 | 5/2019 | Doerksen et al. | |
| 2019/0301130 A1* | 10/2019 | Benevelli | B62D 12/00 |
| 2020/0291609 A1 | 9/2020 | Tevis et al. | |
| 2021/0156118 A1 | 5/2021 | Teranishi et al. | |

FOREIGN PATENT DOCUMENTS

| | | | |
|---|---|---|---|
| JP | 2018-79706 A | 5/2018 | |
| JP | 3229366 U | 12/2020 | |

OTHER PUBLICATIONS

First Office Action for the corresponding Chinese patent application No. 202280035034.7; issued Feb. 3, 2026.

* cited by examiner

1

WORK MACHINE AND METHOD FOR CONTROLLING WORK MACHINE

CROSS-REFERENCE TO RELATED APPLICATIONS

This application is a U.S. National stage application of International Application No. PCT/JP2022/023962, filed on Jun. 15, 2022. This U.S. National stage application claims priority under 35 U.S.C. § 119(a) to Japanese Patent Application No. 2021-134906, filed in Japan on Aug. 20, 2021, the entire contents of which are hereby incorporated herein by reference.

BACKGROUND

Field of the Invention

The present invention relates to a work machine and a method for controlling the work machine.

Background Information

There is a conventional work machine that has a vehicle body, steering control wheels supported by the vehicle body, and a leaning mechanism (see U.S. Pat. No. 8,412,420). With this type of work machine, the work machine can be turned by changing the steering angle of the steering control wheels. Moreover, the turning radius of the work machine can be adjusted by changing the leaning angle of the steering control wheels by means of the leaning mechanism.

SUMMARY

With the abovementioned conventional work machine, when the work machine is turning, the operator needs to operate both a steering lever for changing the steering angle and a leaning lever for changing the leaning angle. That is, the operation when turning the work machine is complicated for the operator. As a result, if the operator is not able to correctly operate both the steering lever and the leaning lever, there is a concern that the operator will not be able to turn the work machine as desired.

An object of the present invention is to provide a work machine with which an operator can easily and appropriately turn the work machine.

A work machine according to one aspect of the present invention comprises a vehicle body, a steering control wheel, a first actuator, a second actuator, a steering angle sensor, a leaning angle sensor, and a controller. The steering control wheel is supported by the vehicle body. The first actuator changes a steering angle of the steering control wheel. The second actuator changes a leaning angle of the steering control wheel. The steering angle sensor outputs a first angle signal indicative of the steering angle. The leaning angle sensor outputs a second angle signal indicative of the leaning angle. The controller acquires the first angle signal and the second angle signal. The controller acquires the steering angle based on the first angle signal. The controller acquires the leaning angle based on the second angle signal. The controller acquires a target leaning angle corresponding to the steering angle. The controller controls the second actuator so that the leaning angle becomes the target leaning angle.

A method according to another aspect of the present invention is a method for controlling a work machine. The work machine includes a vehicle body, a steering control wheel supported by the vehicle body, a first actuator for changing a steering angle of the steering control wheel, a second actuator for changing a leaning angle of the steering control wheel, a steering angle sensor that outputs a first angle signal indicative of the steering angle, and a leaning angle sensor that outputs a second angle signal indicative of the leaning angle.

The method according to the present aspect comprises: acquiring the first angle signal and the second angle signal; acquiring the steering angle based on the first angle signal; acquiring the leaning angle based on the second angle signal; acquiring a target leaning angle corresponding to the steering angle; and controlling the second actuator so that the leaning angle becomes the target leaning angle.

According to the present invention, the second actuator is controlled so that the leaning angle of the steering control wheel becomes the target leaning angle corresponding to the steering angle of the steering control wheel. As a result, the operator is able to automatically set the leaning angle by merely changing the steering angle. As a result, the operator is able to turn the work machine easily and appropriately.

DETAILED DESCRIPTION OF EMBODIMENT(S)

Figure 1:
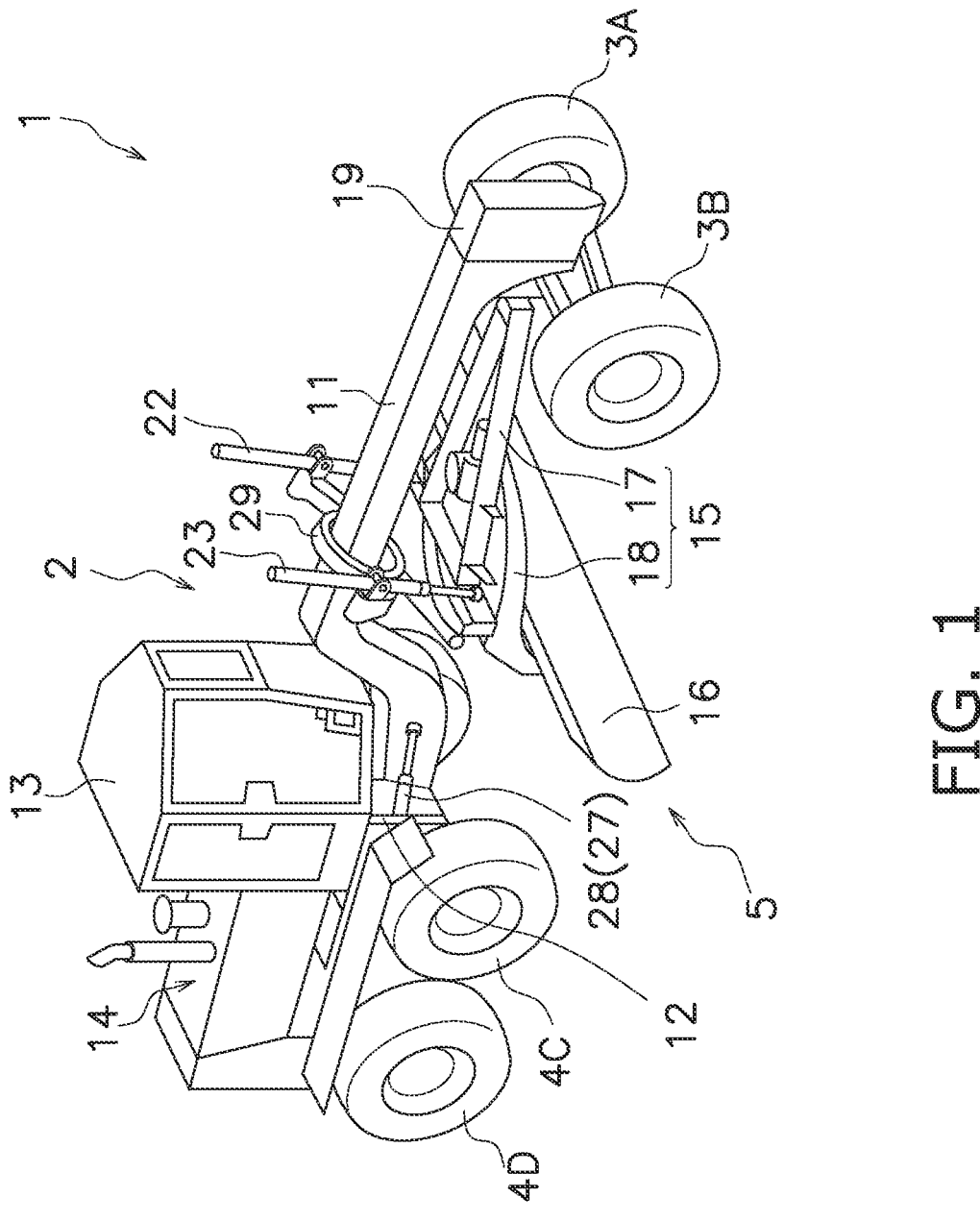
FIG. 1 is a perspective view of a work machine according to an embodiment.
Figure 2:
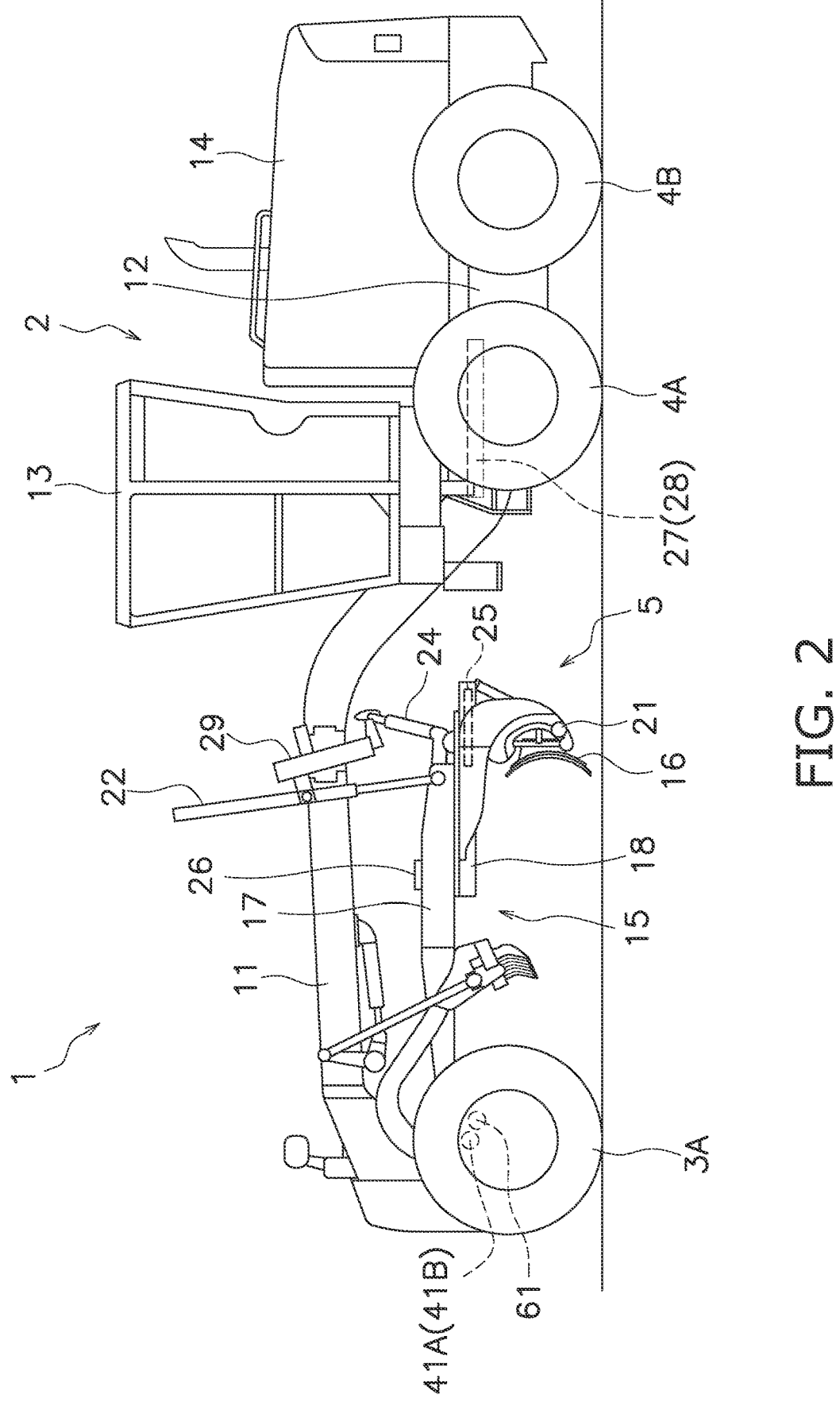
FIG. 2 is a side view of the work machine.

An embodiment of the present invention will be described below with reference to the drawings. FIG. 1 is a perspective view of a work machine 1 according to the embodiment. FIG. 2 is a side view of the work machine 1. As illustrated in FIG. 1, the work machine 1 includes a vehicle body 2, front wheels 3A and 3B, rear wheels 4A to 4D, and a work implement 5. The vehicle body 2 includes a front frame 11, a rear frame, 12, a cab 13, and a power chamber 14.

The rear frame 12 is connected to the front frame 11. The front frame 11 is coupled to the rear frame 12 so as to allow turning with respect to the rear frame 12. For example, the front frame 11 is able to articulate to the left and right with respect to the rear frame 12.

In the following explanation, the front, rear, left, and right directions are defined as the front, rear, left, and right directions of the vehicle body 2 while the articulate angle of the front frame 11 with respect to the rear frame 12 is zero, that is, while the front frame 11 and the rear frame 12 are straight.

The cab 12 and the power chamber 14 are disposed on the rear frame 12. An unillustrated operator's seat is disposed in the cab 12. The cab 12 is disposed behind the power chamber 14. The front frame 11 extends forward from the rear frame 12. The front wheels 3A and 3B are attached to the front frame 11. The front wheels 3A and 3B are disposed away from each other in the left-right direction. The front wheels 3A and 3B are rotatably supported by the front frame 11. The rear wheels 4A to 4D are attached to the rear frame 12.

The work implement 5 is movably connected to the vehicle body 2. The work implement 5 includes a supporting member 15 and a blade 16. The supporting member 15 is movably connected to the vehicle body 2. The supporting member 15 supports the blade 16. The supporting member 15 includes a drawbar 17 and a circle 18. The drawbar 17 is disposed below the front frame 11.

The drawbar 17 is connected to a front part 19 of the front frame 11. The drawbar 17 extends rearward from the front part 19 of the front frame 11. The drawbar 17 is swingably supported at least in the up-down direction and the left-right direction of the vehicle body 2 with respect to the front frame 11. For example, the front part 19 includes a ball joint. The drawbar 17 is rotatably connected to the front frame 11 via the ball joint.

The circle 18 is connected to a rear part of the drawbar 17. The circle 18 is rotatably supported with respect to the drawbar 17. The blade 16 is connected to the circle 18. The blade 16 is supported by the drawbar 17 via the circle 18. As illustrated in FIG. 2, the blade 16 is supported by the circle 18 so as to be able to rotate about a tilt shaft 21. The tilt shaft 21 extends in the left-right direction.

As illustrated in FIG. 2, the work machine 1 includes a plurality of steering actuators 41A and 41B for steering the front wheels 3A and 3B (example of steering control wheel), and a plurality of articulating actuators 27 and 28.

The plurality of steering actuators 41A and 41B are used for steering the front wheels 3A and 3B. For example, the plurality of steering actuators 41A and 41B are hydraulic cylinders. The plurality of steering actuators 41A and 41B are respectively connected to the front wheels 3A and 3B. The plurality of steering actuators 41A and 41B extend and contract due to hydraulic pressure. In the following explanation, the extension and contraction of the plurality of steering actuators 41A and 41B and the extension and contraction of, for example, the hydraulic cylinders are referred to as "stroke motions."

The plurality of steering actuators 41A and 41B include a left steering cylinder 41A and a right steering cylinder 41B. The left steering cylinder 41A and the right steering cylinder 41B are disposed away from each other in the left-right direction.

The left steering cylinder 41A is connected to the front frame 11 and the front wheel 3A. The right steering cylinder 41B is connected to the front frame 11 and the front wheel 3B. The front wheels 3A and 3B are steered by the stroke motions of the left steering cylinder 41A and the right steering cylinder 41B.

The left steering actuator 41A is illustrated in FIG. 2 and the right steering actuator 41B is not illustrated. The left steering actuator 41A and the right steering actuator 41B are counterpart members and therefore the reference symbols of members that are not illustrated in FIG. 2 are depicted in parentheses.

The plurality of articulating actuators 27 and 28 are used for turning the front frame 11 with respect to the rear frame 12. For example, the plurality of articulating actuators 27 and 28 are hydraulic cylinders. The plurality of articulating actuators 27 and 28 are connected to the front frame 11 and the rear frame 12. The plurality of articulating actuators 27 and 28 extend and contract due to hydraulic pressure.

The plurality of articulating actuators 27 and 28 include a left articulate cylinder 27 and a right articulate cylinder 28. The left articulate cylinder 27 and the right articulate cylinder 28 are disposed away from each other in the left-right direction.

The left articulate cylinder 27 is connected to the front frame 11 and the rear frame 12 on the left side of the vehicle body 2. The right articulate cylinder 28 is connected to the front frame 11 and the rear frame 12 on the right side of the vehicle body 2. The front frame 11 turns to the left or right with respect to the rear frame 12 due to the stroke motions of the left articulate cylinder 27 and the right articulate cylinder 28.

The right articulate cylinder 28 is illustrated in FIG. 1 and the left articulate cylinder 27 is not illustrated. The left articulate cylinder 27 is illustrated in FIG. 2 and the right articulate cylinder 28 is not illustrated. The left articulate cylinder 27 and the right articulate cylinder 28 are counterpart members and therefore the reference symbols of members that are not illustrated in FIG. 1 and FIG. 2 are depicted in parentheses.

Figure 3:
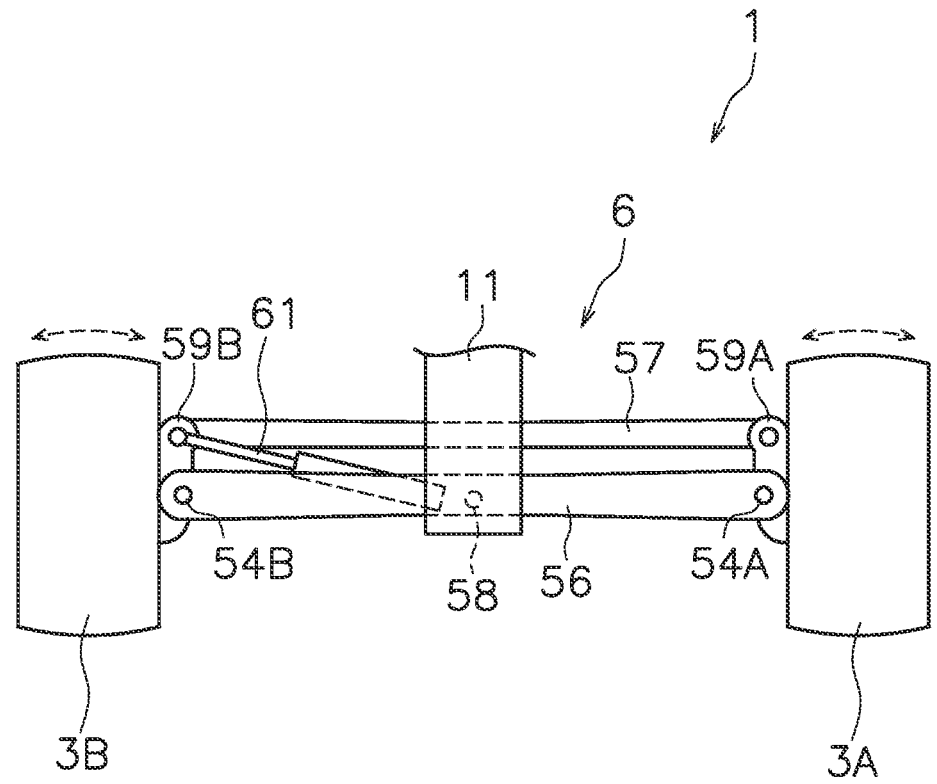
FIG. 3 is a front view of a front part of the work machine.

FIG. 3 is a front view of a front part of the work machine 1. As illustrated in FIG. 3, the work machine 1 includes a lean mechanism 6. The lean mechanism 6 tilts the front wheels 3A and 3B to the left and right. The lean mechanism 6 includes an axle beam 56, a leaning rod 57, and a leaning actuator 61. The axle beam 56 extends from the front frame 11 to the left and right. The axle beam 56 is supported by the front frame 11 so as to be able to rotate about a pivot shaft 58.

The axle beam 56 is connected to the front wheel 3A by means of a wheel bracket 59A. The axle beam 56 supports the front wheel 3A so as to be rotatable about a leaning shaft 54A. The axle beam 56 is connected to the front wheel 3B by means of a wheel bracket 59B. The axle beam 56 supports the front wheel 3B so as to be rotatable about a leaning shaft 54B. The leaning shafts 54A and 54B extend in the front-back direction.

The leaning rod 57 extends to the left and right through the front frame. The leaning rod 57 couples the front wheels 3A and 3B to each other. The leaning rod 57 is connected to the front wheel 3A by means of the wheel bracket 59A. The leaning rod 57 is connected to the front wheel 3B by means of the wheel bracket 59B.

The leaning actuator 61 is used for leaning the front wheels 3A and 3B. The leaning actuator 61 is, for example, a hydraulic cylinder. The leaning actuator 61 is connected to the front frame 11 and the front wheels 3A and 3B. The leaning actuator 61 extends and contracts due to hydraulic pressure. That is, the front wheels 3A and 3B respectively rotate about the leaning shafts 54A and 54B due to the extension and contraction of the leaning actuator 61. Consequently, the front wheels 3A and 3B lean to the left or right.

As illustrated in FIG. 2, the work machine 1 includes a plurality of actuators 22 to 26 for changing the orientation of the work implement 5. The plurality of actuators 22 to 25 are, for example, hydraulic cylinders. The actuator 26 is a rotation actuator. In the present embodiment, the rotation actuator 26 is a hydraulic motor. The rotation actuator 26 may be an electric motor.

The plurality of actuators 22 to 25 are connected to the work implement 5. The plurality of actuators 22 to 25 extend and contract due to hydraulic pressure. The plurality of hydraulic cylinders 22 to 25 change the orientation of the work implement 5 with respect to the vehicle body 2 by extending and contracting.

Specifically, the plurality of hydraulic cylinders 22 to 25 include a left lift cylinder 22, a right lift cylinder 23, a drawbar shift cylinder 24, and a blade tilt cylinder 25.

The left lift cylinder 22 and the right lift cylinder 23 are disposed away from each other in the left-right direction. The left lift cylinder 22 and the right lift cylinder 23 are connected to the drawbar 17. The left lift cylinder 22 and the right lift cylinder 23 are connected to the front frame 11 via a lifter bracket 29. The drawbar 17 swings up and down due to the stroke motions of the left lift cylinder 22 and the right lift cylinder 23. As a result, the blade 16 moves up and down.

The drawbar shift cylinder 24 is coupled to the drawbar 17 and the front frame 11. The drawbar shift cylinder 24 is connected to the front frame 11 via the lifter bracket 29. The drawbar shift cylinder 24 extends diagonally downward from the front frame 11 toward the drawbar 17. The drawbar 17 swings left and right due to the stroke motions of the drawbar shift cylinder 24.

The blade tilt cylinder 25 is connected to the circle 18 and the blade 16. The blade 16 rotates about the tilt shaft 21 due to the stroke motions of the blade tilt cylinder 25.

The actuator 26 is connected to the drawbar 17 and the circle 18. The actuator 26 causes the circle 18 to rotate with respect to the drawbar 17. Consequently, the blade 16 rotates about a rotating axis that extends in the up-down direction.

Figure 4:
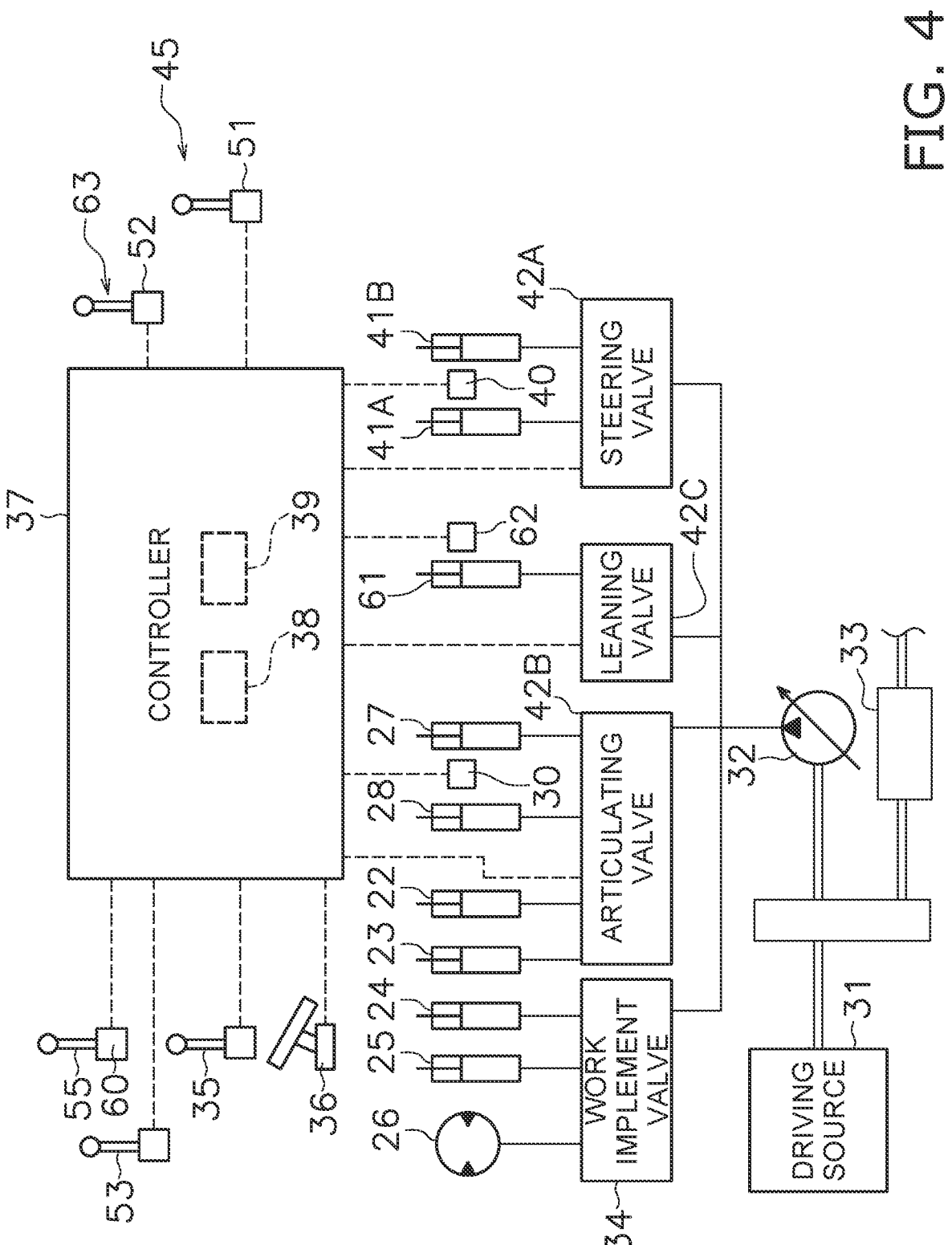
FIG. 4 is a schematic view of a configuration of the work machine.

FIG. 4 is a schematic view of a configuration of the work machine 1. As illustrated in FIG. 4, the work machine 1 includes a driving source 31 and a hydraulic pump 32. The work machine 1 includes a steering valve 42A, an articulating valve 42B, a leaning valve 42C, and a work implement valve 34. The work machine 1 includes a power transmission device 33.

The driving source 31 is, for example, an internal combustion engine. Alternatively, the driving source 31 may be an electric motor or a hybrid of an internal combustion engine and an electric motor.

The hydraulic pump 32 is driven by the driving source 31 thereby discharging hydraulic fluid. The hydraulic pump 32 supplies hydraulic fluid to the steering valve 42A, the articulating valve 42B, and the work implement valve 34. Consequently, the plurality of steering actuators 41A and 41B, the plurality of articulating actuators 27 and 28, and the plurality of actuators 22 to 26 operate. While only one hydraulic pump 32 is illustrated in FIG. 4, a plurality of hydraulic pumps may be provided.

The steering valve 42A is connected through a hydraulic circuit to the hydraulic pump 32 and the plurality of steering actuators 41A and 41B. The steering valve 42A controls the flow rate of hydraulic fluid supplied from the hydraulic pump 32 to the plurality of steering actuators 41A and 41B. The plurality of steering actuators 41A and 41B perform stroke motions due to the hydraulic fluid from the hydraulic pump 32 being supplied to the steering valve 42A.

The articulating valve 42B is connected to the hydraulic pump 32 and the plurality of articulating actuators 27 and 28 through the hydraulic circuit. The articulating valve 42B controls the flow rate of the hydraulic fluid supplied from the hydraulic pump 32 to the plurality of articulating actuators 27 and 28. The plurality of articulating actuators 27 and 28 perform stroke motions due to the hydraulic fluid from the hydraulic pump 32 being supplied to the articulating valve 42B.

The leaning valve 42C is connected through the hydraulic circuit to the hydraulic pump 32 and the leaning actuator 61. The leaning valve 42C controls the flow rate of hydraulic fluid supplied from the hydraulic pump 32 to the leaning actuator 61. The leaning actuator 61 performs stroke motions due to the hydraulic fluid being supplied from the hydraulic pump 32 to the leaning valve 42C.

The work implement valve 34 is connected to the hydraulic pump 32 and the plurality of actuators 22 to 26 through the hydraulic circuit. The work implement valve 34 includes a plurality of valves respectively connected to the plurality of actuators 22 to 26. The work implement valve 34 controls the flow rate of hydraulic fluid supplied from the hydraulic pump 32 to the plurality of actuators 22 to 26.

The power transmission device 33 transmits the driving power from the driving source 31 to the rear wheels 4A to 4D. The power transmission device 33 may include a torque converter and/or a plurality of speed change gears. Alternatively, the power transmission device 33 may be transmission of another type such as a hydraulic static transmission (HST) or a hydraulic mechanical transmission (HMT).

As illustrated in FIG. 4, the work machine 1 includes a steering member 45, an articulating lever 55, a leaning lever 63, a work implement operating member 35, a shift member 53, and an accelerator operating member 36.

The steering member 45 is operable by an operator for steering the front wheels 3A and 3B. The steering member 45 is a lever such as a joy stick. Alternatively, the steering member 45 may be a member other than a lever. For example, the steering member 45 may be a steering wheel.

The steering member 45 is connected to an operation sensor 51. The operation sensor 51 is included in the work machine 1. The operation sensor 51 outputs a steering operation signal that indicates an operation on the steering member 45 by the operator.

The articulating lever 55 is operable by the operator for turning the front frame 11 with respect to the rear frame 12. The articulating lever 55 is a lever such as a joystick. Alternatively, the articulating lever 55 may be a member other than a lever. The articulating lever 55 is connected to an operation sensor 60. The operation sensor 60 is included in the work machine 1. The operation sensor 60 outputs an articulating operation signal that indicates an operation on the articulating lever 55 by the operator.

The leaning lever 63 is operable by an operator for leaning the front wheels 3A and 3B. The leaning lever 63 is a lever such as a joy stick. Alternatively, the leaning lever 63 may be a member other than a lever. The leaning lever 53 is connected to an operation sensor 52. The operation sensor 52 outputs a leaning operation signal that indicates an operation on the leaning lever 63 by the operator.

The work implement operating member 35 is operable by the operator in order to change the orientation of the work implement 5. The work implement operating member 35 includes, for example, a plurality of operating levers. Alternatively, the work implement operating member 35 may be another member such as a switch or a touch screen. The work implement operating member 35 outputs a signal that indicates an operation on the work implement operating member 35 by the operator.

The shift member 53 is operable by the operator for switching between forward travel and reverse travel of the work machine 1. The shift member 53 includes, for example, a shift lever. Alternatively, the shift member 53 may be another member such as a switch or a touch screen. The shift member 53 outputs a signal that indicates an operation on the shift member 53 by the operator.

The accelerator operating member 36 is operable by an operator for controlling the travel of the work machine 1. The accelerator operating member 36 includes, for example, an accelerator pedal. Alternatively, the accelerator operating member 36 may be another member such as a switch or a touch screen. The accelerator operating member 36 outputs a signal that indicates an operation on the accelerator operating member 36 by the operator.

The work machine 1 includes a steering angle sensor 40, an articulate angle sensor 30, and a leaning angle sensor 62. The steering angle sensor 40 is used for detecting a steering angle θ1 of the front wheels 3A and 3B (example of steering control wheel). The steering angle sensor 40 outputs a steering angle signal (first angle signal) that indicates the steering angle θ1. The steering angle signal is, for example, the stroke amounts of the plurality of steering actuators 41A and 41B. The steering angle sensor 40 may directly detect the steering angle θ1.

Figure 5A:
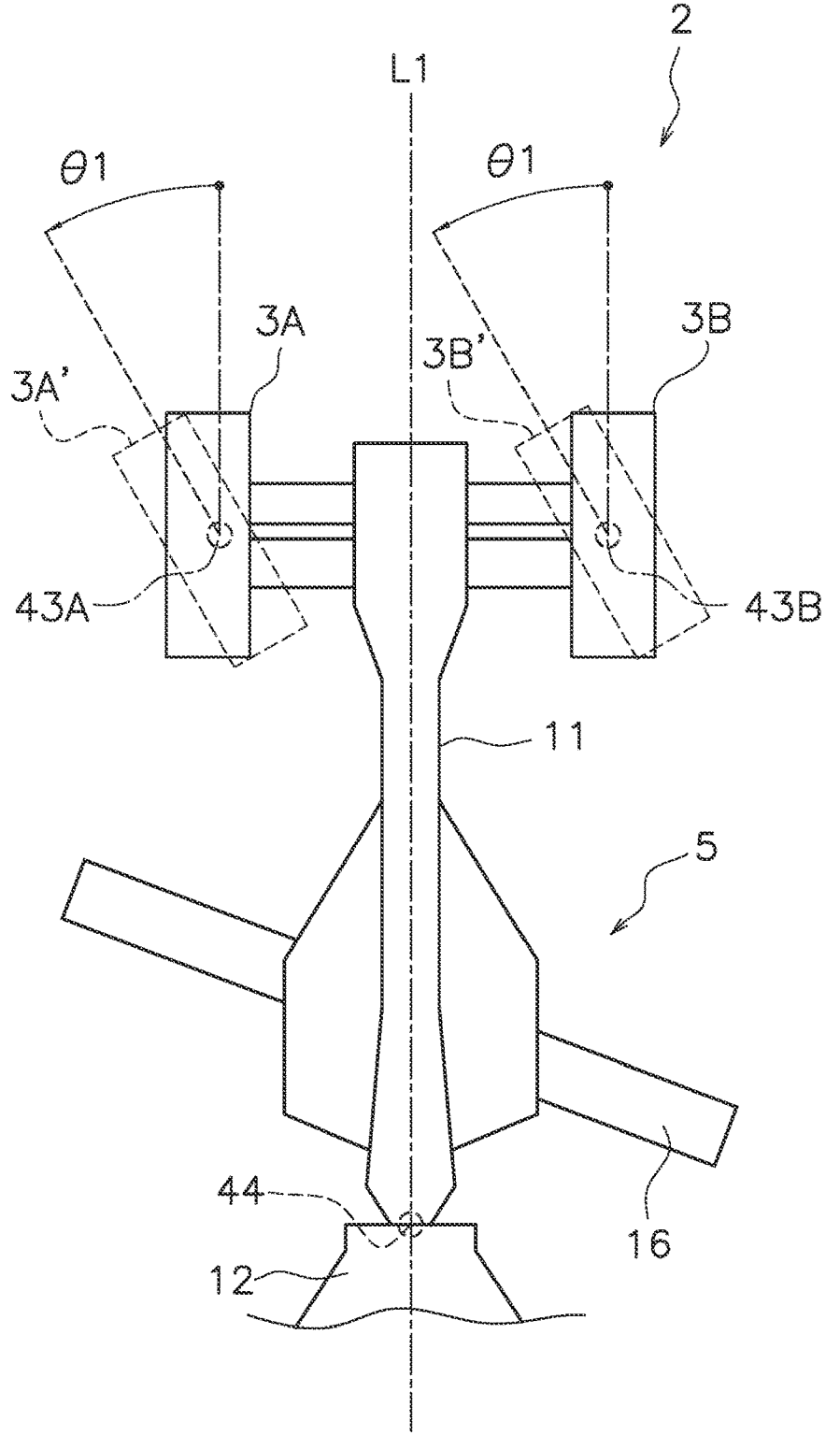
FIG. 5A is a top view of the front part of the work machine.
Figure 5B:
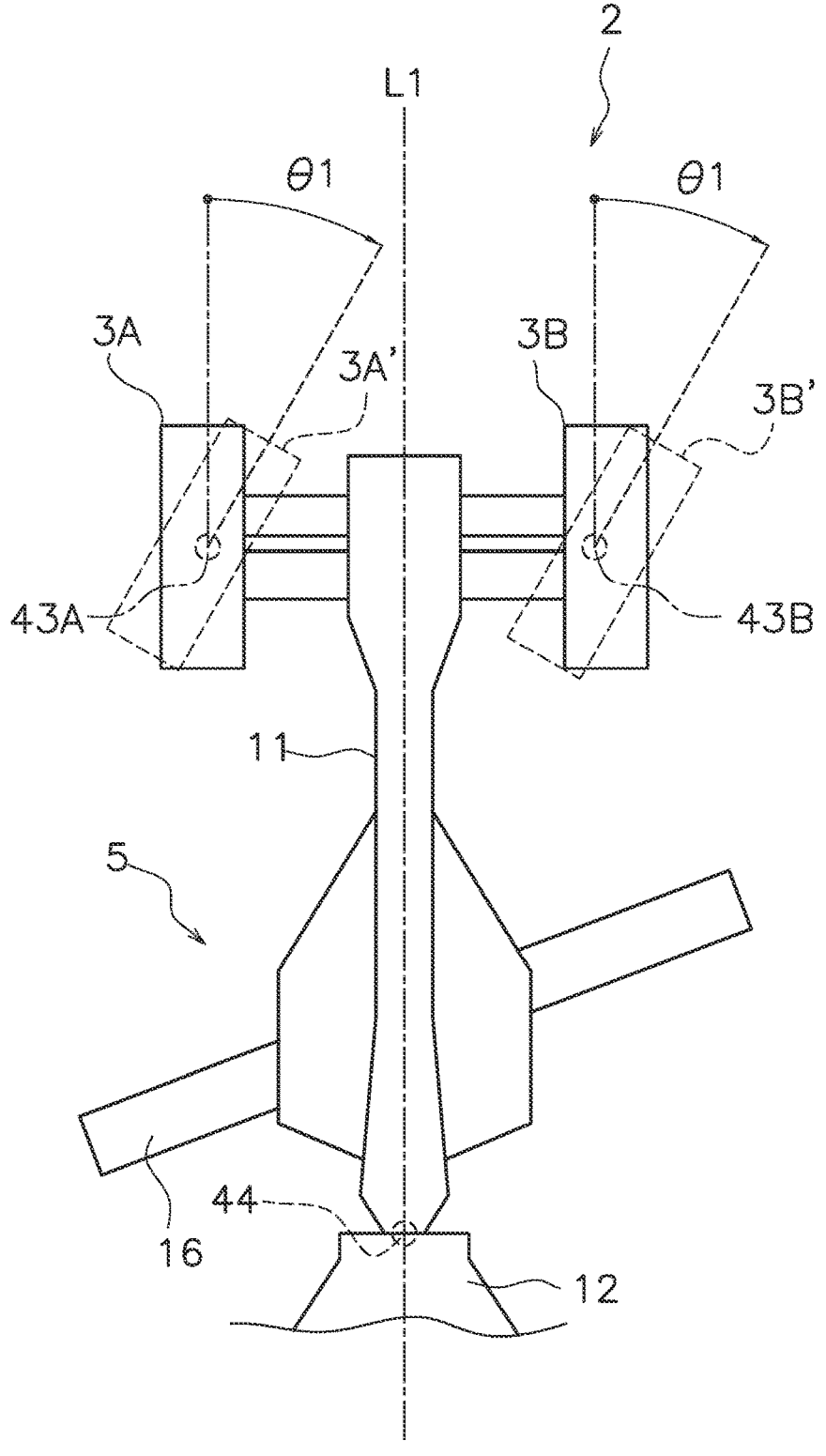
FIG. 5B is a top view of the front part of the work machine.

The steering angle θ1 is defined as described below. FIGS. 5A and 5B are top views of the front part of the work machine 1. In FIGS. 5A and 5B, the articulate angle is zero, that is, the work machine 1 is illustrated in a state in which the front frame 11 is not bent with respect to the rear frame 12.

As illustrated in FIG. 5A, the work machine 1 includes a first steering shaft 43A and a second steering shaft 43B. The first steering shaft 43A and the second steering shaft 43B are the turning shafts of the front wheels 3A and 3B respectively.

The first steering shaft 43A and the second steering shaft 43B are provided to the front frame 11. The first steering shaft 43A and the second steering shaft 43B extend in the up-down direction. The first steering shaft 43A and the second steering shaft 43B turnably support the front wheels 3A and 3B respectively.

The steering angle θ1 is the angle that the front wheels 3A and 3B turn with respect to the front frame 11 about the first steering shaft 43A and the second steering shaft 43B respectively. For example, the steering angle θ1 is the turning angle of the front wheels 3A and 3B with respect to the front-back direction of the front frame 11.

Specifically, a center line L1 is defined on the front frame 11. The center line L1 is the center line of the front frame 11 that extends in the front-back direction of the front frame 11. The center line L1 passes through a below mentioned articulate shaft 44 as seen in a top view of the work machine 1. The steering angle θ1 is the turning angle of the front wheels 3A and 3B in reference to the center line L1.

The steering angle θ1 changes from a neutral position to the left or right due to the stroke motions of the plurality of steering actuators 41A and 41B. The steering angle θ1 at the neutral position is zero degrees. The front wheels 3A and 3B are disposed parallel to the first center line L1 of the front frame 11 at the neutral position. In FIGS. 5A, 3A' and 3B' represent the front wheels while turned by the steering angle θ1 from the neutral position to the left. In FIGS. 5B, 3A' and 3B' represent the front wheels while turned by the steering angle θ1 from the neutral position to the right.

The articulate angle sensor 30 is used to detect the articulate angle of the front frame 11 with respect to the rear frame 12. The articulate angle sensor 30 outputs an articulate angle signal that indicates the articulate angle. The articulate angle signal is, for example, the stroke amounts of the left articulate cylinder 27 and the right articulate cylinder 28. The articulate angle sensor 30 may detect the articulate angle directly.

The articulate angle is defined as described below. As illustrated in FIGS. 5A and 5B, the work machine 1 includes the articulate shaft 44. The articulate shaft 44 is connected to the front frame 11 and the rear frame 12. The articulate shaft 44 extends in the up-down direction. The front frame 11 and the rear frame 12 are connected to each other so as to allow turning about the articulate shaft 44. The articulate angle is the angle that the front frame 11 turns with respect to the rear frame 12 about the articulate shaft 44.

The leaning angle sensor 62 is used for detecting a leaning angle θ2 of the front wheels 3A and 3B. The leaning angle sensor 62 outputs a leaning angle signal (second angle signal) that indicates the leaning angle θ2. The leaning angle signal is, for example, the stroke amount of the leaning actuator 61. The leaning angle sensor 62 may detect the leaning angle θ2 directly.

Figure 6A:
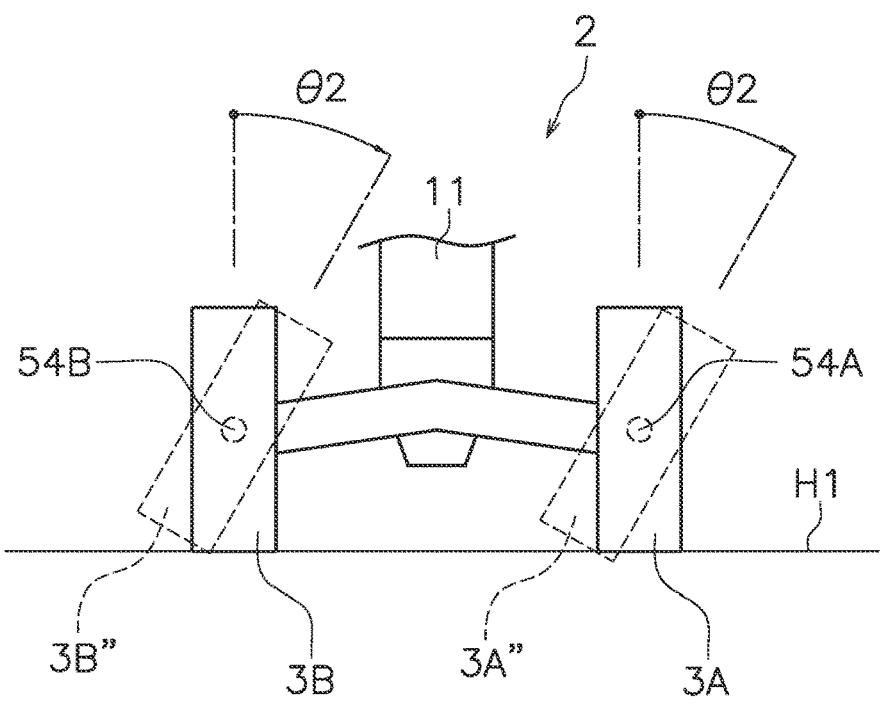
FIG. 6A is a front view for explaining a leaning angle of front wheels.
Figure 6B:
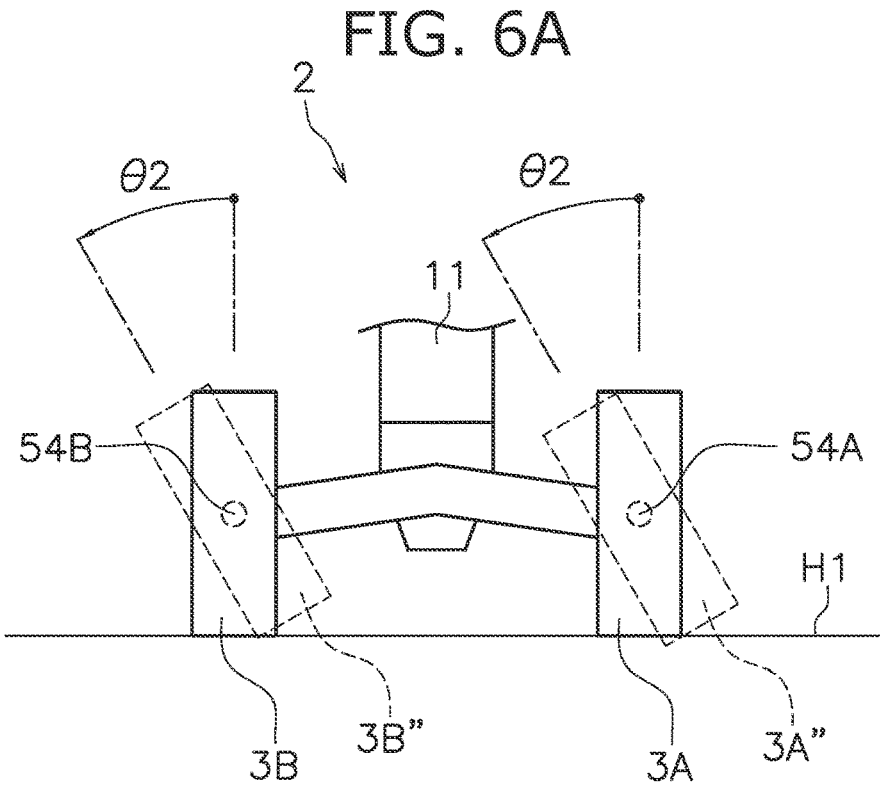
FIG. 6B is a front view for explaining the leaning angle of the front wheels.

The leaning angle θ2 is defined as described below. As illustrated in FIGS. 6A and 6B, the leaning angle θ2 is the tilting angle in the left-right direction of the front wheels 3A and 3B as seen from the front of the vehicle body 2. For example, the leaning angle θ2 is the tilting angle in which the front wheels 3A and 3B respectively tilt about the leaning shafts 54A and 54B as seen from the front of the vehicle body 2. In the following explanation, the state (3A and 3B depicted with solid lines) in which the front wheels 3A and 3B are perpendicular to a horizontal plane H1 is referred to as the neutral state of the front wheels 3A and 3B. The leaning angle θ2 is zero degrees while the front wheels 3A and 3B are in the neutral state.

In FIG. 6A, the front wheels 3A and 3B are changed from the neutral state by the leaning angle θ2 to the left (3A" and 3B" depicted with dashed lines). In FIG. 6B, the front wheels 3A and 3B are changed from the neutral state (3A and 3B depicted with solid lines) by the leaning angle θ2 to the right (3A" and 3B" depicted with dashed lines).

As illustrated in FIG. 4, the work machine 1 includes a controller 37. The controller 37 includes a storage device 38 and a processor 39. The processor 39 is, for example, a CPU and executes a program for controlling the work machine 1. The storage device 38 includes a memory such as a RAM or a ROM, and an auxiliary storage device such as an SSD or an HDD. The storage device 38 stores programs and data for controlling the work machine 1.

The controller 37 controls the power transmission device 33 in response to an operation of the shift member 53. As a result, the traveling direction of the work machine 1 switches between forward travel and reverse travel. Alternatively, the shift member 53 may be mechanically connected to the power transmission device 33. The action of the shift member 53 may be mechanically transmitted to the power transmission device 33 whereby the gears for forward travel and reverse travel of the power transmission device 33 may be switched.

The controller 37 controls the driving source 31 and the power transmission device 33 in response to an operation on the accelerator operating member 36. As a result, the work machine 1 is able to travel. The controller 37 controls the hydraulic pump 32 and the work implement valve 34 in response to an operation on the work implement operating member 35. Consequently, the work implement 5 is operated.

The controller 37 acquires the operating amount of the steering member 45 from the steering operation signal from the operation sensor 51. The controller 37 causes the plurality of steering actuators 41A and 41B to extend and contract by controlling the steering valve 42A in accordance with the steering operation signal. As a result, the controller 37 changes the steering angle θ1 of the front wheels 3A and 3B. The controller 37 acquires the steering angle signal from the steering angle sensor 40. The controller 37 calculates the steering angle θ1 of the front wheels 3A and 3B based on the steering angle signal.

The controller 37 acquires the operating amount of the articulating lever 55 from the articulating operation signal from the articulating lever 55. The controller 37 controls the articulating valve 42B. For example, the controller 37 controls the articulating valve 42B in accordance with the articulating operation signal thereby causing the left articulate cylinder 27 and the right articulate cylinder 28 to extend and contract. As a result, the controller 37 changes the articulate angle. The controller 37 acquires the articulate angle signal from the articulate angle sensor 30. The controller 40 calculates the articulate angle based on the articulate angle signal.

The controller 37 acquires the operating amount of the leaning lever 63 by means of the leaning operation signal from the leaning lever 63. The controller 37 controls the leaning valve 42C. For example, the controller 37 controls the leaning valve 42C in accordance with the leaning operation signal thereby causing the leaning actuator 61 to extend and contract. As a result, the controller 37 changes the leaning angle θ2 in accordance with the operation of the leaning lever 63 by the operator. The controller 37 acquires the leaning angle signal from the leaning angle sensor 62. The controller 37 calculates the leaning angle θ2 based on the leaning angle signal.

Figure 7A:
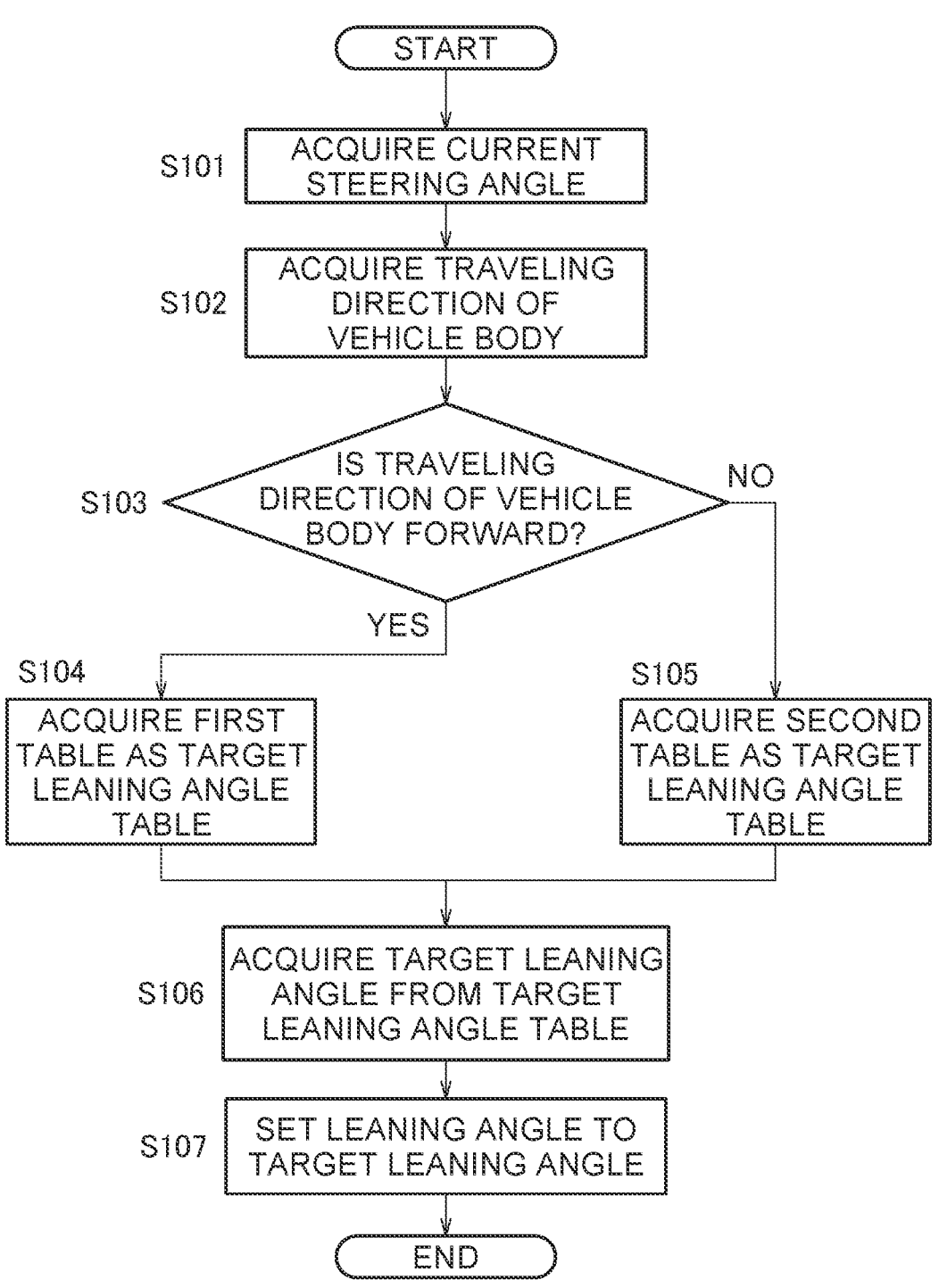
FIG. 7A is a flow chart illustrating processing for automatically setting the leaning angle of the front wheels in accordance with a steering angle of the front wheels.
Figure 7B:
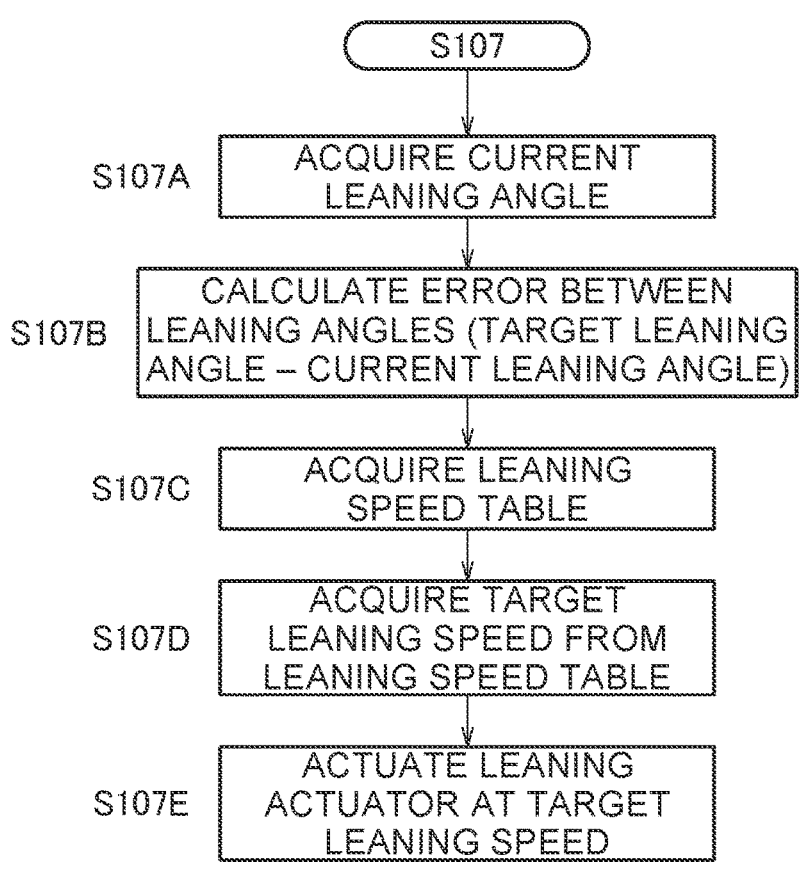
FIG. 7B is a flow chart illustrating processing for automatically setting a leaning speed of the front wheels.

The controller 37 executes an automatic leaning control for changing the leaning angle θ2 in accordance with the steering angle θ1. The following discussion pertains to the automatic leaning control. In the automatic leaning control, the controller 37 controls the leaning valve 42C in accordance with the steering angle θ1 thereby causing the leaning actuator 61 to extend and contract. As a result, the controller 37 automatically changes the leaning angle θ2 without depending upon the operation of the leaning lever 63. FIGS. 7A and 7B are flow charts illustrating processing of the automatic leaning control.

In step S101, the controller 37 acquires the current steering angle θ1.

In step S102, the controller 37 acquires the traveling direction of the vehicle body 2. In step S103, the controller 37 determines whether the traveling direction of the vehicle body 2 is the forward travel direction.

If the traveling direction of the vehicle body 2 is the forward travel direction (Yes in S103), the controller 37 acquires, in step S104, first table data as target leaning angle table data. The first table data is stored in the storage device 38.

Figure 8A:
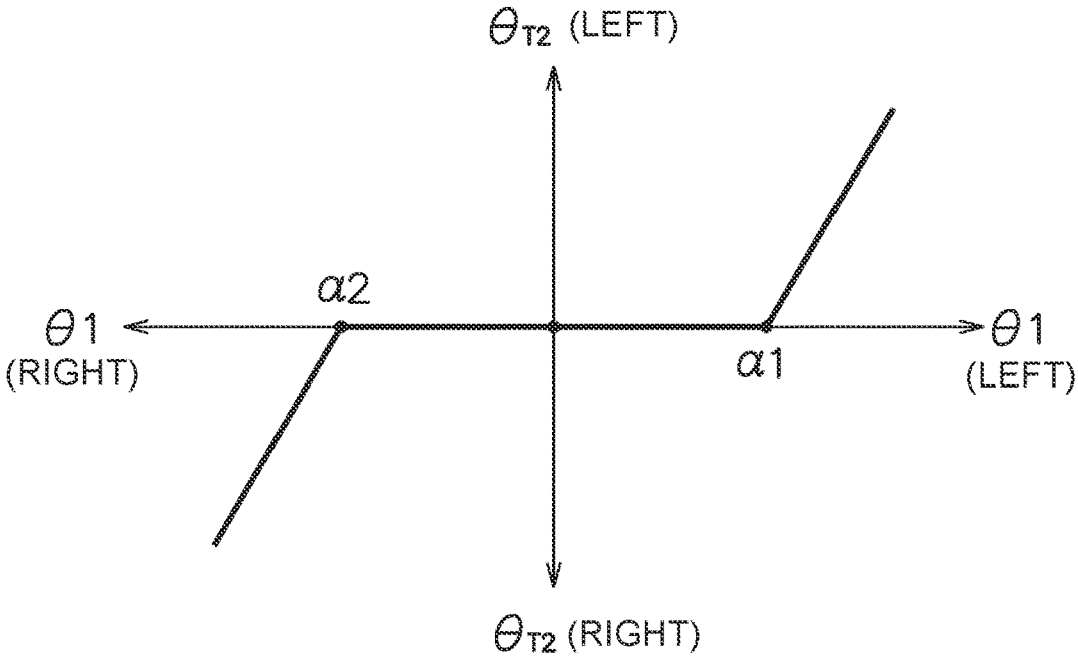
FIG. 8A is a diagram for explaining first table data that represents a correspondence relation between the steering angle and a target leaning angle.

The first table data defines the relationship between the steering angle θ1 of the front wheels 3A and 3B when the vehicle body 2 is traveling forward and a target leaning angle $\theta_{T2}$. FIG. 8A illustrates an example of the first table data. As illustrated in FIG. 8A, in the first table data, when the steering angle θ1 of the front wheels 3A and 3B to the left is equal to or less than α1, the target leaning angle $\theta_{T2}$ is zero. When the steering angle θ1 to the left of the front wheels 3A and 3B is larger than α1, the target leaning angle $\theta_{T2}$ to the left increases as the steering angle θ1 increases. When the steering angle θ1 of the front wheels 3A and 3B to the right is equal to or less than α2, the target leaning angle $\theta_{T2}$ is zero. When the steering angle θ1 of the front wheels 3A and 3B to the right is larger than α2, the target leaning angle $\theta_{T2}$ to the right increases as the steering angle θ1 increases.

If the traveling direction of the vehicle body 2 is the not the forward travel direction (No in S103), that is, when the traveling direction of the vehicle body 2 is the reverse travel direction, the controller 37 acquires, in step S105, second table data as the target leaning angle table data. The second table data is stored in the storage device 38.

Figure 8B:
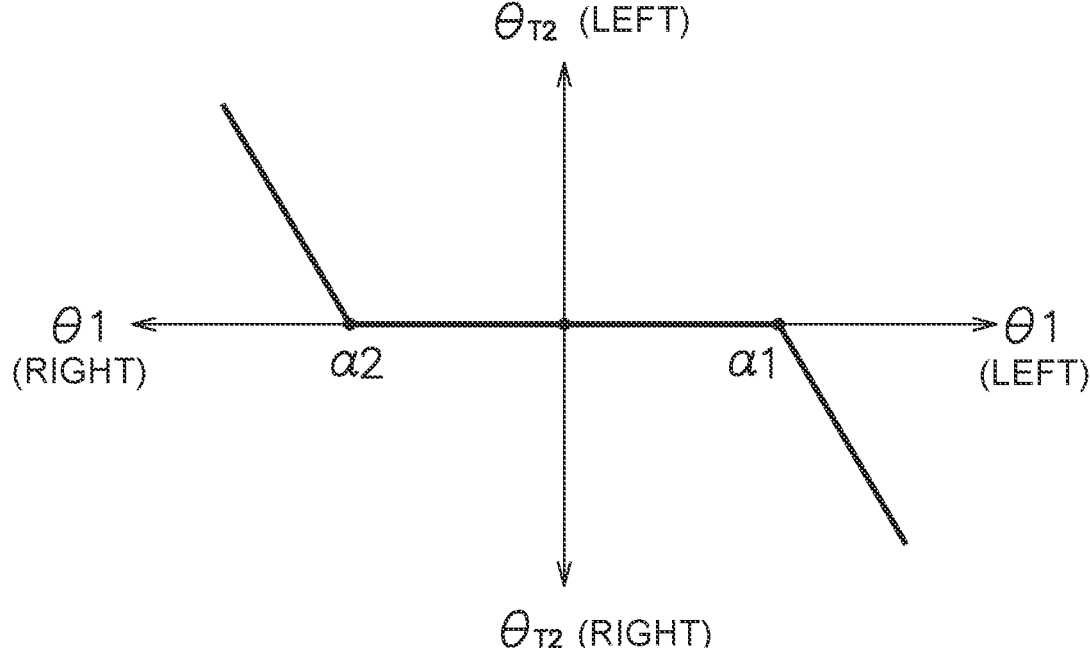
FIG. 8B is a diagram for explaining second table data that represents a correspondence relation between the steering angle and the target leaning angle.

The second table data defines the relationship between the steering angle θ1 of the front wheels 3A and 3B when the vehicle body 2 is traveling in reverse and the target leaning angle $\theta_{T2}$. FIG. 8B illustrates an example of the second table data. As illustrated in FIG. 8B, in the second table data, when the steering angle θ1 of the front wheels 3A and 3B to the left is equal to or less than α1, the target leaning angle $\theta_{T2}$ is zero. When the steering angle θ1 of the front wheels 3A and 3B to the left is larger than α1, the target leaning angle $\theta_{T2}$ to the right increases as the steering angle θ1 increases.

When the steering angle θ1 of the front wheels 3A and 3B to the right is equal to or less than α2, the target leaning angle $\theta_{T2}$ is zero. When the steering angle θ1 of the front wheels 3A and 3B to the right is larger than α2, the target leaning angle $\theta_{T2}$ to the left increases as the steering angle θ1 increases. In the first table data and the second table data, the correspondence relation between the steering angle θ1 and the target leaning angle $\theta_{T2}$ may be associated by using a function. In this case, the function that indicates the correspondence relation between the steering angle θ1 and the target leaning angle $\theta_{T2}$ is stored in the storage device 38.

In step S106, the controller 37 refers to the target leaning angle table data and acquires the target leaning angle $\theta_{T2}$ corresponding to the steering angle θ1 from the target leaning angle table data.

In step S107, the controller 37 controls the leaning actuator 61 so that the leaning angle θ2 becomes the target leaning angle $\theta_{T2}$. In step S107, the controller 37 controls the leaning actuator 61 by executing the processing described in FIG. 7B.

In step S107A, the controller 37 acquires the current leaning angle θ2. In step S107B, the controller 37 calculates the error $(=\theta_{T2}-\theta 2)$ between the target leaning angle $\theta_{T2}$ and the current leaning angle θ2. In step S107C, the controller 37 acquires speed table data.

The speed table data defines the relationship between the leaning angle θ2 of the front wheels 3A and 3B and a target leaning speed. In the speed table data, the target leaning speed increases as the leaning angle θ2 increases. The speed table data is stored in the storage device 38. The correspondence relation between the leaning angle θ2 and the target leaning speed may be associated by using a function. In this case, the function that indicates the correspondence relation between the leaning angle θ2 and the target leaning speed is stored in the storage device 38.

In step S107D, the controller 37 refers to the speed table data and acquires the target leaning speed corresponding to the current leaning angle θ2 from the leaning speed table. In step S107E, the controller 37 actuates the leaning actuator 61 at the target leaning speed until the aforementioned error becomes zero. When the aforementioned error becomes zero, the controller 37 ends the processing of step S107.

As explained above, when the vehicle body 2 is traveling forward, the controller 37 refers to the first table data and determines the target leaning angle $\theta_{T2}$ from the steering angle θ1. Therefore, when the steering angle θ1 to the left is equal to or less than α1 or when the steering angle θ1 to the right is equal to or less than α2, the target leaning angle θ$_{T2}$ is zero. Therefore, the controller 37 maintains the front wheels 3A and 3B in the neutral state. Alternatively, the controller 37 may maintain the previous leaning angle θ2 based on an operation of the operator.

When the steering angle θ1 to the left is greater than α1, the controller 37 controls the leaning actuator 61 so that the leaning angle θ2 becomes the target leaning angle θ$_{T2}$ to the left that increases in accordance with the increase of the steering angle θ1. Consequently, as illustrated in FIG. 5A, when the front wheels 3A and 3B are steered to the left, the leaning actuator 61 is controlled so that the front wheels 3A and 3B lean to the left as illustrated in FIG. 6A.

When the steering angle θ1 to the right is greater than α1, the controller 37 controls the leaning actuator 61 so that the leaning angle θ2 becomes the target leaning angle θ$_{T2}$ to the right that increases in accordance with the increase of the steering angle θ1. Consequently, as illustrated in FIG. 5B, when the front wheels 3A and 3B are steered to the right, the leaning actuator 61 is controlled so that the front wheels 3A and 3B lean to the right as illustrated in FIG. 6B.

When the vehicle body 2 is traveling in reverse, the controller 37 refers to the second table data and determines the target leaning angle θ$_{T2}$ from the steering angle θ1. Therefore, when the steering angle θ1 to the left is equal to or less than α1 or when the steering angle θ1 to the right is equal to or less than α2, the target leaning angle θ$_{T2}$ is zero in the same way as when the vehicle body 2 is traveling forward.

When the steering angle θ1 to the left is greater than α1, the controller 37 controls the leaning actuator 61 so that the leaning angle θ2 becomes the target leaning angle θ$_{T2}$ to the right that increases in accordance with the increase of the steering angle θ1. When the steering angle θ1 to the right is greater than α2, the controller 37 controls the leaning actuator 61 so that the leaning angle θ2 becomes the target leaning angle θ$_{T2}$ to the left that increases in accordance with the increase of the steering angle θ1. Therefore, the leaning direction of the front wheels 3A and 3B during reverse travel are the opposite of the leaning direction of the front wheels 3A and 3B during forward travel.

In the work machine 1 according to the present embodiment explained above, the controller 37 acquires the steering angle θ1 based on the steering angle signals. The controller 37 acquires the leaning angle θ2 based on the leaning angle signals. The controller acquires a target leaning angle θ$_{T2}$ corresponding to the steering angle θ1. The controller 37 controls the leaning actuator 61 so that the leaning angle θ2 becomes the target leaning angle θ$_{T2}$. As a result, the leaning angle θ2 is changed in accordance with the steering angle θ1.

As a result, the operator is able to automatically set the leaning angle θ2 corresponding to the steering angle θ1 by only operating the first steering member 45 and/or the second steering member 46 without operating the leaning lever 63. That is, the operator is able to turn the work machine 1 easily and appropriately.

Although an embodiment of the present invention has been described so far, the present invention is not limited to the above embodiment and various modifications may be made within the scope of the invention.

The leaning angle θ2 may be changed in accordance with the steering angle θ1 while the front frame 11 is turned with respect to the rear frame 12. For example, when the articulate angle is "θ3," the table data is used that indicates the correspondence relation between the difference (=θ1−θ3)

between the steering angle θ1 and the articulate angle θ3, and the target leaning angle θ$_{T2}$.

In this case, the leaning angle θ2 can be automatically set to the target leaning angle θ$_{T2}$ with the same processing state of the aforementioned embodiment by switching the steering angle θ1 of the horizontal axis in FIGS. 8A and 8B to the difference (=θ1−θ3) between the steering angle θ1 and the articulate angle θ3.

The automatic leaning control may be switched between active and inactive. The controller 37 may acquire the current roll angle of the vehicle body 2 and set the automatic leaning control to active when the roll angle is equal to or less than a predetermined roll angle or set the automatic leaning control to inactive when the roll angle is greater than the predetermined roll angle.

According to the present invention, the operator is able to automatically set the leaning angle by merely changing the steering angle. That is, the operator is able to turn the work machine 1 easily and appropriately.

The invention claimed is:

1. A work machine comprising:
a vehicle body;
a steering control wheel supported by the vehicle body;
a first actuator configured to change a steering angle of the steering control wheel;
a second actuator configured to change a leaning angle of the steering control wheel;
a steering angle sensor configured to output a first angle signal indicative of the steering angle;
a leaning angle sensor configured to output a second angle signal indicative of the leaning angle; and
a controller configured to
    acquire the first angle signal and the second angle signal,
    acquire the steering angle based on the first angle signal,
    acquire the leaning angle based on the second angle signal,
    acquire a target leaning angle corresponding to the steering angle, and
    control the second actuator so that the leaning angle becomes the target leaning angle,
the target leaning angle being zero when the steering angle is equal to or smaller than a predetermined angle, and the target leaning angle being set to increase as the steering angle increases when the steering angle is larger than the predetermined angle.

2. The work machine according to claim 1, wherein the controller is configured to acquire the target leaning angle corresponding to the steering angle based on table data indicative of a correspondence relation between the steering angle and the target leaning angle.

3. The work machine according to claim 1, wherein the controller is configured to control the second actuator so that a leaning direction of the steering control wheel during reverse travel is opposite the leaning direction of the steering control wheel during forward travel.

4. A method for controlling a work machine that includes a vehicle body, a steering control wheel supported by the vehicle body, a first actuator for changing a steering angle of the steering control wheel, a second actuator for changing a leaning angle of the steering control wheel, a steering angle sensor configured to output a first angle signal indicative of the steering angle, and a leaning angle sensor configured to output a second angle signal indicative of the leaning angle, the method comprising:

acquiring the first angle signal and the second angle signal;

acquiring the steering angle based on the first angle signal;

acquiring the leaning angle based on the second angle signal;

acquiring a target leaning angle corresponding to the steering angle; and controlling the second actuator so that the leaning angle becomes the target leaning angle, the target leaning angle being zero when the steering angle is equal to or smaller than a predetermined angle, and the target leaning angle being set to increase as the steering angle increases when the steering angle is larger than the predetermined angle.

5. The method according to claim 4, further comprising:

acquiring the target leaning angle corresponding to the steering angle based on table data indicative of a correspondence relation between the steering angle and the target leaning angle.

6. The method according to claim 4, further comprising:

controlling the second actuator so that a leaning direction of the steering control wheel during reverse travel is opposite the leaning direction of the steering control wheel during forward travel.

* * * * *